(12) United States Patent
Brown et al.

(10) Patent No.: US 6,509,434 B1
(45) Date of Patent: Jan. 21, 2003

(54) AROMATIC AMINE CURATIVES AND THEIR USE

(75) Inventors: William R. Brown, Baton Rouge, LA (US); John C. Prindle, Jr., Baton Rouge, LA (US); Gregory H. Lambeth, Baton Rouge, LA (US)

(73) Assignee: Albemarle Corporation, Richmond, VA (US)

( * ) Notice: Subject to any disclaimer, the term of this patent is extended or adjusted under 35 U.S.C. 154(b) by 0 days.

(21) Appl. No.: 09/528,837

(22) Filed: Mar. 20, 2000

(51) Int. Cl.$^7$ ............................................. C08G 18/32
(52) U.S. Cl. ............................ 528/64; 528/69; 528/68; 528/79; 560/25
(58) Field of Search .............................. 528/68, 64, 69, 528/79; 560/25

(56) References Cited

U.S. PATENT DOCUMENTS

| | | | |
|---|---|---|---|
| 1,940,757 A | 12/1933 | Lehmann et al. | 8/5 |
| 2,923,743 A | 2/1960 | Delfs et al. | 260/609 |
| 3,272,814 A | 9/1966 | Cutler et al. | 260/249.9 |
| 3,406,202 A | 10/1968 | Reifschneider et al. | 260/578 |
| 3,920,444 A | 11/1975 | Harrington et al. | 71/103 |
| 4,146,688 A | 3/1979 | Schwindt et al. | 521/159 |
| 4,294,934 A | 10/1981 | Grogler et al. | 521/160 |
| 4,594,453 A | 6/1986 | Ranken et al. | 564/440 |
| 4,595,742 A | 6/1986 | Nalepa et al. | 528/64 |
| 4,670,597 A | 6/1987 | Ranken et al. | 564/440 |
| 4,670,598 A | 6/1987 | Davis | 564/440 |
| 4,760,188 A | 7/1988 | Ranken et al. | 564/440 |
| 4,866,209 A | 9/1989 | Ranken et al. | 564/440 |
| 4,889,955 A | 12/1989 | Ranken | 564/440 |
| 4,982,002 A | 1/1991 | McKinnie et al. | 564/440 |
| 5,143,942 A | 9/1992 | Brown | 521/110 |
| 5,166,299 A | 11/1992 | Nalepa | 528/64 |
| 5,962,619 A | 10/1999 | Seneker et al. | 528/64 |

OTHER PUBLICATIONS

Albemarle Corporation Brochure, "Meeting Chemistry's Challenges For A Better World", 1998, p. 24.
Albemarle Corporation Brochure, "ETHACURE 100 Curative, Pourable Curatives for Epoxies, Urethanes and Spray Coatings", 1999, 16 pages.
Albemarle Corporation Brochure, "ETHACURE 300 Curative, A Convenient Liquid For All Commercially Available Prepolymers", 1997, 14 pages.
Fieser, et al., Reagents for Organic Synthesis, 1967, p. 41.
J.I.G. Cadogan, "A Convenient New Method of Aromatic Arylation", J. of Chem. Soc., 1962, Part III, pp. 4257–4258.
Giam, et al., "A Simple Preparation of Aromatic of Heteroaromatic Sulphides", J. of Chem. Soc. Chem. Comm., 1980, vol. 16, ppg 756–757.
Fujisawa, et al., "Rearrangement of Aryl Sulfides in the Presence of Aluminum Chloride", Bull. Chem. Soc. Japan, 1970, vol. 43, ppg 1189–1196.
Fruednabm et al., "Aprotic Diazotization of Arylamines in Aromatic Solvents. The Effect of Addition of Strong Acid", J. of Organic Chem., 1968, vol. 33, No. 4, 1968, ppg 1633–1638.
Pullin et al., "Effect of Ortho–Alkylation on the Mutagenicity/Carcinogenicity of Aromatic Amines", J. of the Am. College of Toxicology, 1984, vol. 4, p. 109.

Primary Examiner—Samuel Barts
(74) Attorney, Agent, or Firm—Edgar E. Spielman, Jr.

(57) ABSTRACT

Mixtures of isomeric alkylthiated mononuclear aromatic amines comprising in the range of about 30 to about 70 mole percent of (i) at least one 3,5-di(alkyl-thio)-2,6-diamino-1-alkylbenzene and in the range of about 30 to about 70 mole percent of at least one 3,5-di(alkylthio)-2,4-diamino-1-alkylbenzene, such mixture containing at least about 90 mole percent of (i) and (ii), and optionally containing up to 10 mole percent of one or more isomers of (i) and/or (ii). An alkyl group may be present as a substituent in lieu of a hydrogen atom in the remaining ring position. These mixtures are useful as curatives or extenders in processes for making polyurethanes, polyurethane-ureas, and polyureas.

18 Claims, 1 Drawing Sheet

AROMATIC AMINE CURATIVES AND THEIR USE

TECHNICAL FIELD

This invention relates to novel mixtures of substituted aromatic amines which are effective curatives for use in the manufacture of polyurethane-ureas and polyureas, and to the use of such mixtures in the production of polyurethane-urea and polyurea polymers.

BACKGROUND 3,5-Di(methylthio)-2,6-diaminotoluene (a.k.a. 3,5-di(methylthio)-2,6-toluenediamine) is an effective curative in the preparation of polyurethanes (U.S. Pat. No. 4,982,002). Unfortunately, the compound is very costly to produce, as the intermediate for its production, 2,6-diaminotoluene, is itself very expensive. Thus in practice relatively pure 3,5-di(methylthio)-2,6-diaminotoluene is typically prepared by reacting a commercially-available, relatively low-cost mixture of about 80% 2,4-diaminotoluene and 20% 2,6-diaminotoluene with methyl disulfide to form an approximate 80:20 mixture of 3,5-di(methylthio)-2,4-diaminotoluene and 3,5-di(methylthio)-2,6-diaminotoluene, and subjecting this mixture to rather tedious, time-consuming separation procedures to recover the 2,6-diamino isomer. Also, the reaction rate of 3,5-di(methylthio)-2,6-diaminotoluene with isocyanate prepolymer is relatively fast, and thus handling of the reaction mixture can be difficult.

The approximate 80:20 mixture of 3,5-di(methylthio)-2,4-diaminotoluene and 3,5-di(methylthio)-2,6-diaminotoluene itself is a cost-effective commercially-available curative sold as ETHACURE® 300 curative by Albemarle Corporation. The product is a low-viscosity, liquid aromatic diamine curative for either 2,4- or 80:20 TDI polyether and TDI polyester prepolymers. Cast polyurethane physical properties are comparable to or better than those reported with other typical aromatic diamines.

It would be highly desirable if new polyurethane chain extenders could be found that are easier and thus less costly than pure 3,5-di(methylthio)-2,6-diaminotoluene, that are less reactive with isocyanate prepolymer than 3,5-di(methylthio)-2,6-diaminotoluene, and, if possible, that could produce polyurethane polymers having thermo-mechanical properties at least comparable, if not superior, to those of a mixture formed by methylthiation of a mixture of 80% 2,4-diaminotoluene and 2,6-diaminotoluene as described, for example, in U.S. Pat. No. 4,982,002.

This invention makes it possible to achieve most, if not all, of these desirable objectives.

SUMMARY OF THE INVENTION

Pursuant to an embodiment of this invention there is provided a mixture of isomeric alkylthiated mononuclear aromatic amines comprising in the range of about 30 to about 70 mole percent of (i) at least one component of the formula

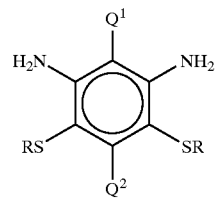

and in the range of about 30 to about 70 mole percent of (ii) at least one component of the formula

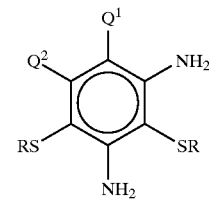

wherein $Q^1$ is an alkyl group of from 1 to 4 carbon atoms, $Q^2$ is, independently, a hydrogen atom or an alkyl group of from 1 to 4 carbon atoms, and each R is, independently an alkyl group of from 1 to 4 carbon atoms, and wherein the total percentage of (i) and (ii) in the mixture is at least 90 mole percent, and preferably at least 95 mole percent, such mixture optionally containing up to 10 mole percent, and preferably up to no more than 5 mole percent, of one or more isomers of (i) and (ii).

Pursuant to another embodiment of this invention, $Q^2$ in the above formulas is a hydrogen atom. Thus in this embodiment there is provided a mixture of isomeric alkylthiated mononuclear aromatic amines comprising in the range of about 30 to about 70 mole percent of (i) at least one 3,5-di(alkylthio)-2,6-diamino-1-alkylbenzene and in the range of about 30 to about 70 mole percent of at least one 3,5-di(alkylthio)-2,4-diamino-1-alkylbenzene, such mixture containing at least about 90 mole percent of (i) and (ii), and optionally containing up to 10 mole percent of one or more isomers of (i) and/or (ii). Preferred mixtures contain in the range of about 40 to about 60 mole percent of (i), and in the range of about 40 to about 60 mole percent of (ii), with at least about 95 mole percent of the mixture being (i) and (ii), and optionally up to about 5 mole percent of the mixture being one or more isomers of (i) and/or (ii). Particularly preferred are mixtures as above in which the mixture comprises in the range of about 52 to about 58 mole percent of (i) and in the range of about 42 to about 48 mole percent of (ii), and the total percentage of (i) and (ii) in the mixture is at least 98 mole percent, such mixture optionally containing up to 2 mole percent of one or more isomers of (i) and (ii). In each of these embodiments the two alkylthio groups and the alkyl group in the 1-position each contain, independently, in the range of 1 to 4 carbon atoms. More preferably, the two alkylthio groups are either methylthio or ethylthio groups, most preferably methylthio, and the alkyl group in the 1-position is methyl.

Another embodiment of this invention is the provision of processes of producing polyurethanes using a mixture of isomeric alkylthiated mononuclear aromatic amines of this invention. In one such process a polyurethane-urea cast elastomer is produced by casting into a mold a reaction mixture of an isocyanate prepolymer and a curative comprising at least one mixture of isomeric alkylthiated mononuclear aromatic amines of this invention, and curing the reaction mixture in the mold.

Still another embodiment of this invention is a polyurethane-urea formed by curing an isocyanate prepolymer with a mixture of isomeric alkylthiated mononuclear aromatic amines of this invention. For example, this invention provides a polyurethane—urea polymer produced in accordance with a process of any of originally presented claims 13–24 hereof.

These and other embodiments and features of this invention will be still further apparent from the ensuing description, the accompanying Drawing, and the appended claims.

FURTHER DETAILED DESCRIPTION

Figure 1:
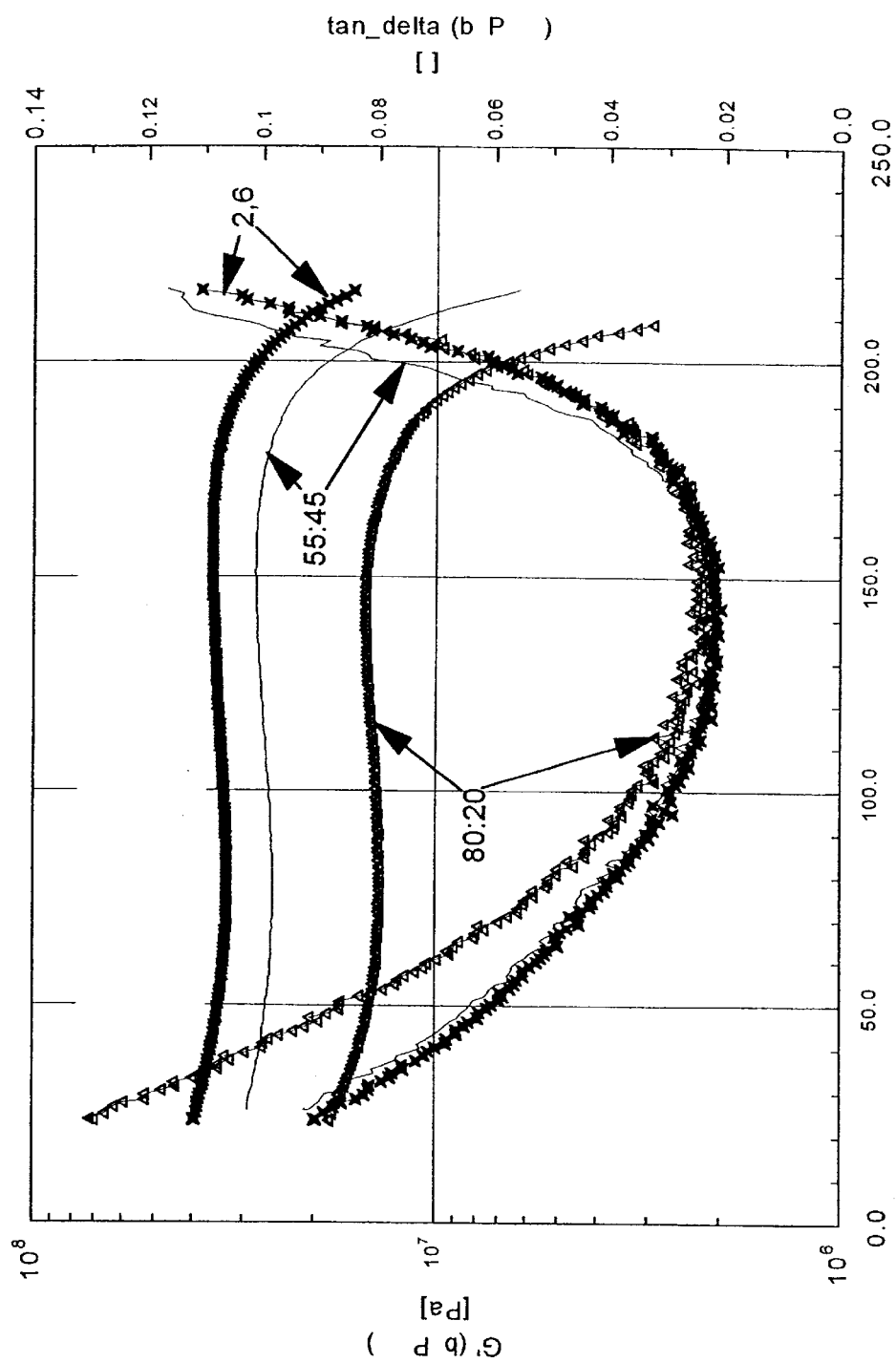
FIG. 1 is a graphical presentation of results of thermo-mechanical measurements of several polyurethane cast elastomers in a rheometric dynamic analyzer.

As indicated above, this invention relates in part to a general area of technology which is commonly referred to as polyurethane technology. Strictly speaking, however, when the novel substituted aromatic diamine mixtures of this invention are used in making "polyurethane" polymers, the products are either polyurethane-ureas or polyureas depending upon the makeup of the polymerizable materials used in the reaction. Thus when an isocyanate reacts with both a hydroxyl-terminated material and an amine-terminated material and all polymerizable materials have more than one reactive site, the result is the formation of a polyurethane-urea. But when an isocyanate and an amine-terminated material are used and both have more than one reactive site, the result is the formation of a polyurea.

A feature of this invention is that the mixtures of this invention when used as curatives with isocyanate prepolymers can provide polyurethane-urea polymers with thermo-mechanical properties relatively close to those obtainable with pure 3,5-di(alkylthio)-2,6-diamino-1-alkylbenzene, which is much more difficult and expensive to produce. In addition, the mixtures of this invention can provide polyurethane-urea polymers with thermo-mechanical properties significantly better than polyurethane polymers produced using a corresponding 80:20 mixture of a 3,5-di(alkylthio)-2,4-diamino-1-alkylbenzene-3,5-di(alkylthio)-2,6-diamin6-1-alkylbenzene.

These highly beneficial results were demonstrated by a group of comparative experiments wherein polyurethane-urea polymers were prepared using three different curatives, and the thermo-mechanical properties of the resultant polymers were determined. The curatives used were:

Curative A—essentially pure 3,5-di(methylthio)-2,6-diaminotoluene (2,6-DMTDA);

Curative B—ETHACURE® 300 curative (Albemarle Corporation), an 80:20 blend of 2,4-DMTDA and 2,6-DMTDA isomers; and Curative C—a composition of this invention composed of an approximate 45:55 mixture of 2,4-DMTDA and 2,6-DMTDA isomers.

For the purposes of these comparative tests Curative A was prepared using a laboratory synthesis in which the product was recovered by careful fractionation. Curative B was a sample of the commercially-produced ETHACURE® 300 curative. Curative C was formed by mixing together a sample of the 2,6-DMTDA and a sample of ETHACURE® 300 curative to produce the isomer blend of 45:55 2,4:2,6-DMTDA isomers. These three respective curatives were used to cure Adiprene® LF-950A, a TDI/PTMEG type isocyanate prepolymer manufactured by Uniroyal Chemical Company. Thermo-mechanical property evaluations were carried out using a rheometric dynamic analyzer from Rheometrics, Inc.

The three polymers for these tests were prepared as follows: A steel mold was conditioned by first coating its surfaces with a silicone mold release and then conditioning it at 100° C. It was of the type that produces two 5-inch×6-inch×0.080-inch sheets of polymer. The prepolymer, Adiprene® LF-950A (120 grams) was placed in the mixing tube of a Kogan polymer reactor and was brought up to reaction temperature under a vacuum to condition and degas it before mixing. An amount of the curative under test equal to 95% of the number of equivalents of isocyanate present, was heated to its process temperature, and was then added to the prepolymer in the mixing tube. The two liquid components were mixed for one minute and the resultant mixture was poured into the molds. The filled molds were then placed in an oven at 100° C. and left for 30 minutes. After the 30-minute in-mold cure time the polymer parts were removed from the molds and were replaced in the oven set at 100° C. for a post-cure. The parts were allowed to stay at their post-cure temperature for an 18-hour period after which they were cooled to room temperature before cutting test pieces.

In the thermo-mechanical property evaluations, sample parts 0.25-inch×1.5-inches were cut from the resulting polymer sheets and tested on the rheometric dynamic analyzer, ramping the temperature from room temperature (25° C.) to 250° C. at 10° C./minute while the apparatus measured the change in polymer stiffness (G') and the energy absorbed by the polymer (tan-delta) in the process. It was found that in terms of polymer dynamic modulus (G'), Curative C of this invention produced a polyurethane polymer of this invention having substantially better dynamic modulus as compared to the polymer made using the commercial product. In fact, Curative C of this invention produced a polyurethane polymer of this invention having a dynamic modulus of comparable to that of the polymer formed with Curative A, the curative that is much more expensive tp produce and use. These results can be seen by inspection of the test data depicted in FIG. 1 of the Drawing. In terms of energy absorption (tan-delta), there was little difference among the three polymers. Table 1 sets forth the onset temperature of dynamic modulus drop off for each polymer, and also the temperatures of the maximum tan-delta for each polymer, all as determined from the curves of FIG. 1. These results are referred to in Table 1 as Test Group I. Table 1 also presents the same data points for another set of three samples formed in the same way from the same raw materials, the only difference being in the higher post cure temperature used (i.e., 16 hours at 130° C.). These results are referred to in Table 1 as Test Group II.

TABLE 1

Summary of RDA Test Results

|  | Curative B Polymer | Curative C Polymer | Curative A Polymer |
|---|---|---|---|
| Test Group I |  |  |  |
| G' softening onset temperature, ° C. | 141.43 | 157.94 | 160.88 |

TABLE 1-continued

Summary of RDA Test Results

|  | Curative B Polymer | Curative C Polymer | Curative A Polymer |
|---|---|---|---|
| Temperature at tan Delta max., ° C. Test Group II | 208.75 | 216.31 | 216.08 |
| G' softening onset temperature, ° C. | 139.88 | 149.70 | 155.64 |
| Temperature at tan Delta max., ° C. | 202.18 | 211.07 | 215.91 |

As noted above, the mixtures of isomeric alkylthiated mononuclear aromatic amines comprise in the range of about 30 to about 70 mole percent of component (i) and in the range of about 30 to about 70 mole percent of component (ii). Such mixture contains at least about 90 to 100% mole percent of the combination of components (i) and (ii), and optionally contain up to 10 mole percent of one or more isomers of (i) and/or (ii). Preferred mixtures contain in the range of about 40 to about 60 mole percent of (i), and in the range of about 40 to about 60 mole percent of (ii), with at least about 97 mole percent of the mixture being (i) and (ii), and optionally up to about 3 mole percent of the mixture being one or more isomers of (i) and/or (ii). Particularly preferred are mixtures as above in which the mixture comprises in the range of about 52 to about 58 mole percent of (i) and in the range of about 42 to about 48 mole percent of (ii), and the total percentage of (i) and (ii) in the mixture is at least 98 mole percent, such mixture optionally containing up to 2 mole percent of one or more isomers of (i) and (ii). In each of these embodiments the alkyl group in the 1-position, (and the other alkyl group on the ring, if present) and the two alkylthio groups each contain, independently, in the range of 1 to 4 carbon atoms. More preferably, the two alkylthio groups are either methylthio or ethylthio groups, most preferably methylthio. Most preferably the alkyl group in the 1-position is methyl, and there is no second alkyl group on the ring (i.e., $Q^2$ in the above formulas is a hydrogen atom).

Non-limiting examples of component (i) include 3,5-di(propylthio)-2,6-diaminotoluene, 3,5-di(propylthio)-2,6-diamino-1,4-xylene, 3,5-di(isopropylthio)-2,6-diaminotoluene, 3,5-di(isopropylthio)-2,6-diamino-1,4-xylene, 3,5-di(butylthlo)-2,6-diaminotoluene, 3,5-di(butyl-thio)-2,6-diamino-1,4-xylene, 3,5-di(tert-butylthio)-2,6-diaminotoluene, 3,5-di(tert-butyl-thio)-2,6-diamino-1,4-xylene, and the homologous compounds in which the methyl group in the 1-position and/or in the 4-position is replaced by an ethyl, propyl, or butyl group, as well as the more preferred and the most preferred compounds exemplified below, and mixtures of any two or more of any such compounds whether preferred and/or not preferred. Compounds having two different alkylthio groups, such as, for example, 3-ethylthio-5-methyl-thio-2,6-diaminotoluene can also be present. Non-limiting examples of more preferred component (i) compounds include 3,5-di(ethylthio)-2,6-diaminotoluene, 3,5-di(ethylthio)-2,6-diamino-1,4-xylene, 3,5-di(ethylthio)-2,6-diamino-1-methyl-4-ethylbenzene, and the homologous compounds in which either orboth ofthe methyl groups in the 1- and/or 4-positions is/are replaced by a $C_2$–$C_4$ alkyl group, such as, for example, 3,5-di(ethylthio)-2,6-diamino-1-ethylbenzene, 3,5-di(ethylthio)-2,6-diamino-1,4-diethylbenzene, and 3,5-di(ethylthio)-2,6-diamino-1-butylbenzene. Most preferred are the methylthio substituted compounds, such as, for example, 3,5-di(methyl-thio)-2,6-diamino-1-toluene, 3,5-di(methylthio)-2,6-diamino-1,4-xylene, 3,5-di(methylthio)-2,6-diamino-1-methyl-4-ethylbenzene, 3,5-di(methylthio)-2,6-diamino-1-ethyl-4-methylbenzene, and the homologous compounds in which methyl group in the 1- and/or the 4-position is/are replaced by a $C_2$–$C_4$ alkyl group, such as, for example, 3,5-di(methylthio)-2,6-diamino-1-ethylbenzene, 3,5-di(methylthio)-2,6-diamino-1,4-diethylbenzene, and 3,5-di(methylthio)-2,6-diamino-1-butylbenzene.

Non-limiting examples of component (ii) include 3,5-di(propylthio)-2,4-diaminotoluene, 3,5-di(propylthio)-2,4-diamino-1,6-xylene, 3,5-di(isopropylthio)-2,4-diaminotoluene, 3,5-di(isopropylthio)-2,4-diamino-1,6-xylene, 3,5-di(butylthio)-2,4-diaminotoluene, 3,5-di(butylthio)-2,4-diamino-1,6-xylene, 3,5-di(tert-butylthio)-2,4-diaminotoluene, 3,5-di(tert-butylthio)-2,4-diamino-1,6-xylene, and the homologous compounds in which the methyl group in the 1-position and/or the 6-position is/are replaced by an ethyl, propyl, or butyl group, as well as the more preferred and the most preferred compounds exemplified below, and mixtures of any two or more of any such compounds whether preferred and/or not preferred. Compounds having two different alkylthio groups, such as, for example, 3-ethylthio-5-methylthio-2,4-diaminotoluene can also be present. Non-limiting examples of more preferred component (ii) compounds include 3,5-di(ethylthio)-2,4-diaminotoluene, 3,5-di(ethylthio)-2,4-diamino-1,6-xylene, 3,5-di(ethylthio)-2,4-diamino-1-methyl-6-ethylbenzene, and the homologous compounds in which either or both of the methyl groups in the 1- and/or 6-position is/are replaced by a $C_2$–$C_4$ alkyl group, such as, for example, 3,5-di(ethylthio)-2,6-diamino-1-ethylbenzene, 3,5-di(ethylthio)-2,4-diamino-1,6-diethylbenzene, and 3,5-di(ethylthio)-2,4-diamino-1-butylbenzene. Most preferred are the methylthio substituted compounds, such as, for example, 3,5-di(methylthio)-2,4-diaminotoluene, 3,5-di(methylthio)-2,4-diamino-1,6-xylene, 3,5-di(methylthio)-2,4-diamino-1-methyl-6-ethylbenzene, 3,5-di(methylthio)-2,4-diamino-1-ethyl-6-methyl-benzene, and the homologous compounds in which the methyl group in the 1- and/or 4-position is/are replaced by a $C_2$–$C_4$ alkyl group, such as, for example, 3,5-di(methylthio)-2,4-diamino-1-ethylbenzene, 3,5-di(methylthio)-2,4-diamino-1,6-diethyl-benzene, and 3,5-di(methylthio)-2,4-diamino-1-butylbenzene.

Most preferred mixtures are those in which component (i) is 3,5-di(methylthio)-2,6-diaminotoluene and component (ii) is 3,5-di(methylthio)-2,4-diaminotoluene.

The isomers of components (i) and (ii) that can be present in limited amounts in the mixtures of this invention can be any positional isomer or isomers in which there are (A) two $C_1$–$C_4$ alkylthio groups, two amino groups, one $C_1$–$C_4$ alkyl group, and one hydrogen atom on the ring and/or (B) two $C_1$–$C_4$ alkylthio groups, two amino groups, and two $C_1$–$C_4$ alkyl groups, in positions other than the positions specified above for components (i) and (ii).

Mixtures of components (i) and (ii) and, if present, isomer(s) thereof, that have two alkylthio groups, two amino groups, one alkyl group, and one hydrogen atom on the ring are preferred over components (i) and (ii) and, if present, isomer(s) thereof, that have two alkylthio groups, two amino groups, and two alkyl groups on the ring. However mixtures of any and all such components or isomers can be used provided the proportions of the mixture meet the requirements specified herein.

The mixtures of this invention can be formed by blending together the components either individually or in the form of (1) at least one component (i) compound and (2) a preformed mixture of at least one component (i) compound and at least one component (ii) compound. Another way of producing such mixtures involves alkylthiation of appropriately-proportioned blends of the corresponding alkyl-substituted aromatic diamines. Methods for producing such compounds are described for example in U.S. Pat. Nos. 4,595,742; 4,760,188; and 4,982,002.

Synthesis of 3,5-di(methylthio)-2,6-diaminotoluene (2,6-DMTDA) can be performed as follows: The reactor used is a five-gallon reactor equipped with an impeller stirrer, a thermocouple thermometer, a dropping funnel inserted into the charging port, and an overhead condenser to condense and return dimethyldisulfide (DMDS) to the reactor. The condenser outlet is connected to a tube leading to a three-gallon can with outlet and inlet. The can, cooled with dry-ice, is used to collect methyl mercaptan co-product which can be disposed of by burning after completion of the reaction. 2,6-Toluenediamine (Aldrich Chemical Co.) (9 and 98/100 kilograms; 81.8 moles) is melted and then added to the five-gallon stirred reactor. Copper iodide (4.3 mole %, 340 grams, 1.75 moles) is also added and the mixture is allowed to stir for an hour at 150° C. Dimethyldisulfide (DMDS) addition is then commenced. Addition of DMDS is continuous, and the reactor temperature is maintained between 143–147° C. for 8 hours. The reaction can be monitored by GC and when the % 2,6-DMTDA is greater than 97%, the reaction is stopped.

Crude 2,6-DMTDA is transferred into a five-gallon can containing 560 g of NaOH to precipitate the catalyst. This mixture is stirred overnight with a paddle stirrer inserted through the drum top. Following filtration to remove the catalyst, the crude product is charged to a 5-gallon reactor fitted with a glass overhead fastened to the reactor by means of a rubber stopper in the charge port. Purified 2,4-DMTDA is then recovered by distillation. In an operation conducted in this manner, the distillation yielded 10,986 g (62%) of 95% pure 2,4-DMTDA, b.p. 180° C./1.3 torr.

Synthesis of 3,5-di(methylthio)-2,4-diaminotoluene (2,4-DMTDA) can be performed as follows: The reactor used is a five-gallon reactor equipped with an impeller stirrer, a thermocouple thermometer, a dropping funnel inserted into the charging port, and an overhead condenser to condense and return dimethyldisulfide (DMDS) to the reactor. The condenser outlet is connected to a tube leading to a three-gallon can with outlet and inlet. The can, cooled with dry-ice, is used to collect methyl mercaptan co-product which can be disposed of by burning after completion of the reaction. 2,4-Toluenediamine (Aldrich Chemical Co.) (9 and 98/100 kilograms; 81.8 moles) is melted and then added to the five-gallon stirred reactor. Copper iodide (4.3 mole %, 340 grams, 1.75 moles) is also added and the mixture is allowed to stir for an hour at 150° C. Dimethyldisulfide (DMDS) addition is then commenced. Addition of DMDS is continuous, and the reactor temperature is maintained between 143–147° C. for 8 hours. The reaction can be monitored by GC and when the % 2,4-DMTDA is greater than 97%, the reaction is stopped. Table 2 shows the progress of a synthesis performed for 8 hours in this manner.

TABLE 2

Alkylthiolation of 2,4-Toluenediamine (TDA)

| Time, hr | % TDA | % Mono No. 1 | % Mono No. 2 | % 2,4-DMTDA | % Tri |
|---|---|---|---|---|---|
| 1 | 33.7 | 7.7 | 52 | 6.5 | — |
| 2 | 13.3 | 21.1 | 32 | 33.6 | — |
| 3 | 5.7 | 20.1 | 22.9 | 51.2 | — |
| 4 | 1.9 | 15.7 | 13.9 | 68.3 | — |
| 5 | 0.6 | 9.1 | 9 | 80.7 | — |
| 6 | — | 1.3 | 0.6 | 97 | — |
| 7 | — | 0.8 | 0.5 | 97.1 | — |
| 8 | — | 0.6 | 0.2 | 97.5 | trace |

Crude 2,4-DMTDA is transferred into a five-gallon can containing 560 g of NaOH to precipitate the catalyst. This mixture is stirred overnight with a paddle stirrer inserted through the drum top. Following filtration to remove the catalyst, the crude product is charged to a 5-gallon reactor fitted with a glass overhead fastened to the reactor by means of a rubber stopper in the charge port. Purified 2,4-DMTDA is then recovered by distillation. In an operation conducted in this manner, the distillation yielded 10,986 g (62%) of 95% pure 2,4-DMTDA, b.p. 180° C./1.3 torr.

Polyurethane-ureas of this invention are formed by curing an isocyanate prepolymer with a mixture of isomeric alkylthiated mononuclear aromatic amines described above. If desired, the procedures and conditions described U.S. Pat. No. 4,595,742 can be used for this purpose. Other processes are possible but typically, however, the isocyanate prepolymer and the mixture of the isomeric alkylthiated mononuclear aromatic amines of this invention are mixed together in proportions in the range of about 80 to about 130 equivalents, and preferably in the range of about 90 to about 100 equivalents, of the isomeric alkylthiated mononuclear aromatic amine mixture per hundred equivalents of the isocyanate prepolymer. Typically these materials when mixed are at or above room temperature, but either or both materials can be preheated if desired. The mold used is preferably preconditioned by use of a suitable mold release agent such as a silicone conditioning agent.

The mixture is then added to the mold which has been heated to one or more temperatures in the range of about 25 to about 130° C. The polymeric part is left in the mold for a suitable period in the range of about 10 to about 40 minutes. Typically the polymer is removed from the mold and then post-cured for about 1 to about 20 hours at a temperature in the range of about 25 to about 150° C.

Isocyanate prepolymers containing in the range of 2 to about 29 wt % of unreacted isocyanate groups are preferably used in forming the polyurethanes of this invention, and a wide variety of such prepolymers are available as articles of commerce.

Table 3 summarizes the results of comparisons of Vicat and DSC melt point determinations on the several polymers (Test Group III) made in the same way from the same materials as Test Group II above, except the prepolymer used was Adiprene LF-601-D. The Vicat softening point tests were conducted in accordance with ASTM D 648-82, with a 50 ° C. per hour rate of temperature increase. The DSC softening point data were obtained with the rate of temperature increase being 10° C. per hour.

TABLE 3

Summary of Vicat and DSC Test Results

| Test Group III | Curative B Polymer | Curative C Polymer | Curative A Polymer |
|---|---|---|---|
| Vicat Softening Point, ° C. | 175 | 185 | 205 |
| DSC Melt Point, ° C. | 220 | 225 | 244 |

From the foregoing description it can be seen that this invention provides novel mixtures of substituted aromatic amines which can be used in the manufacture of polyurethane-ureas and polyureas in any of a wide variety of processes and under a variety known process conditions in which any of a variety of additional known components are also employed.

This invention also provides a variety of methods in which these novel mixtures are employed in combination with one or more known reaction components and/or additive components. Among the various methods by which the process may be practiced are, for example, reaction injection molding (RIM) processes, cast elastomer processes, foam elastomer processes, resin transfer molding processes, rotational molding processes, spray processes, two-part spray coating processes, as well as any other methods of polymerization known in the polyurethane arts.

In addition, this invention provides new and useful polyurethanes, polyurethane-ureas, and polyureas which can be made by using a novel mixture of substituted aromatic amines of this invention as an extender or curing agent in any conventional process technique known in the polyurethane, polyurethane-urea, or polyurea arts. As an example of such polyurethanes, polyurethane-ureas, and polyureas, this invention in one of its embodiments provides a polyurethane-urea or polyurea produced by reacting:

A) a mixture of isomeric alkylthiated mononuclear aromatic amines comprising in the range of about 30 to about 70 mole percent of (i) at least one component of the formula

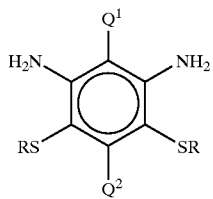

and in the range of about 30 to about 70 mole percent of (ii) at least one component of the formula

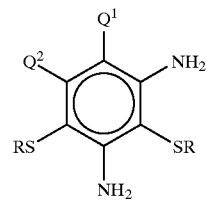

wherein $Q^1$ is an alkyl group of from 1 to 4 carbon atoms, $Q^2$ is, independently, a hydrogen atom or an alkyl group of from 1 to 4 carbon atoms, and each R is, independently an alkyl group of from 1 to 4 carbon atoms, and wherein the total percentage of (i) and (ii) in the mixture is at least 95 mole percent, such mixture optionally containing up to 10 mole percent of one or more isomers of (i) and (ii); with B) a di- or polyisocyanate or an isocyanate prepolymer containing free —NCO groups, or C) a blend of a di- or polyisocyanate or an isocyanate prepolymer containing free —NCO groups with at least one hydroxyl- or amine-terminated aliphatic compound.

Reference has been made in this disclosure to isocyanate prepolymers. As is well-known in the art, such prepolymers are reaction products comprising free-isocyanate groups that are prepared by reacting an organic active hydrogen group-containing compound (e.g., a di- or polyfunctional hydroxy compound, such as polyols, hydroxyl-terminated polyesters or polyethers, castor oil, etc.) with a stoichiometric excess of a polyisocyanate component. In some instances, a large excess can be added to the reaction zone and subsequently some of the excess removed by distillation or flash under reduced pressure. The prepolymer contains free —NCO groups in an amount over the range of 0.1 to about 20 percent by weight, preferably 0.5 to 15.0 percent by weight, more preferably 2.0 to 7.0 percent by weight. The initial process step yields a prepolymer which has not yet been extended by the chain extenders provided by this invention. The amount of polyisocyanate used is generally from about 1.1 to 2 or more equivalents per equivalent of organic active hydrogen group-containing compound. This prepares a prepolymer which can then be reacted with the chain extender comprising an aromatic diamine mixture of this invention which acts as a "curing agent".

It may be desirable to admix the curing agent and the prepolymer after the prepolymer has been heated to a temperature to reduce the viscosity of the prepolymer. This temperature is above 25° C., usually above 50° C, more usually above about 70° C. However, the temperature should not be so high as to exceed the point at which the prepolymer or any material admixed therewith undergoes an undesirable amount of thermal decomposition. This is generally avoided by keeping the temperature below 150° C. usually about 100° C. or lower. By way of example, a cast elastomer may be produced pursuant to this invention from a prepolymer first prepared by reacting toluene diusocyanate (80 weight percent 2,4- and 20 weight percent 2,6-isomers) with a polyester of adipic acid and ethylene glycol such that the isocyanate number is 1.1. This prepolymer is then stirred with a sufficient quantity of one of the chain extenders of the invention such that the isocyanate number is reduced to about 1.0. The resultant mixture is poured into a mold that has been preheated to 110° C. The resultant product is removed from the mold after at least about 5 minutes or more, typically after 1 hour or more.

The di- or polyisocyanate components which can be used in forming polyurethanes and polyurethane-ureas of this invention can be organic isocyanates containing at least two —NCO groups in the molecule, including for example aliphatic, cycloaliphatic, aralphatic, aromatic, and heterocyclic polyisocyanates among others. A few specific illustrative examples include ethylene diisocyanate, tetramethylene-1,4-diisocyanate; hexamethylene-1,6-diisocyanate, dodecane-1,12-diisocyanate; cyclobutane-1,3-diisocyanate; cyclohexane-1,3-diisocyanate and cyclohexane-1,4-diisocyanate (and mixtures of these isomers); 1-isocyanato-3,3,5-trimethyl-5-isocyanatomethyl-cyclohexane; hexahydrotolylene-2,4-diisocyanate; hexahydrotolylene-2,6-diisocyanate (and mixtures of these isomers); hexahydrophenylene-1,3-diisocyanate;

hexahydrophenylene-1,4-diisocyanate; perhydrodiphenylmethane-2,4'-diisocyanate;perhydrodiphenylmethane-4,4'-diisocyanate; phenylene-1,3-diisocyanate; phenylene-1,4-diisocyanate; tolylene-2,4-diisocyanate and tolylene-2,6-diisocyanate (and mixtures of these isomers); diphenylmethane-2,4'-diisocyanate; diphenylmethane-4,4'-diisocyanate; naphthylene-1,5-diisocyanate; triphenylmethane-4,4',-4"-triisocyanate; polyphenyl-polymethylene polyisocyanates; meta and para isocyanato-phenylsulfonylisocyanates; perchlorinated aryl polyisocyanates; polyisocyanates having carbodiimide groups; polyisocyanates containing allophanate groups; polyisocyanates containing isocyanurate groups; polyisocyanates containing urethane groups; polyisocyanates containing acylated urea groups; polyisocyanates containing biuret groups; polyisocyanates prepared by telomerization reactions; polyisocyanates having ester groups; reaction products of the above-mentioned isocyanates with acetals; polyisocyanates containing polymeric fatty acid groups; 1,3,5-benzenetriisocyanate; polyarylpolyalkylenepolyisocyanates such as polymethylenepolyphenylisocyanate; isocyanates prepared by the phosgenation of the reaction product between aniline and formaldehyde having a functionality of about 2.2 to about 3.5; and others, such as are referred to in *Encyclopedia of Polymer Science and Tehcnology*, John Wiley & Sons, copyright 1969, volume 11, pages 506–563.

As a general rule, it is preferred to use readily available polyisocyanates such as tolylene-2,4-diisocyanate and tolylene-2,6-diisocyanate and mixtures of these isomers (TDI); polyphenylpolymethylenepolyisocyanates; and polyisocyanates containing carbodiimide groups, urethane groups, allophanate groups, isocyanurate groups, urea groups, or biuret groups or mixtures of any of the above.

The component of the polyurethane reaction mixture described herein as an organic active hydrogen group-containing compound is typically a polyether diol or a polyester diol. However the organic active hydrogen group-containing compound may be a similar component suitable for reaction with the polyisocyanate component to form a prepolymer in the cast elastomer embodiment of the invention. Typically, the polyols contain about 90 percent of the hydroxyl groups present as primary hydroxyls.

The polyether polyols useful for the invention are made by polymerization of cyclic ethers such as ethylene oxide, propylene oxide, butylene oxide, tetrahydrofuran, and the like. These cyclic ethers can be used individually or as mixtures or in successive fashion when making a polyether. For example, when it is desired to prepare a polyether polyol with a predominance of hydroxyl groups bonded to primary carbon atoms, it is known that such materials can be made by initially polymerizing propylene oxide and/or a higher oxide and then reacting the intermediate thereby produced with ethylene oxide. The organic compounds typically have at least two primary hydroxyl groups (or amine terminal groups) and a molecular weight of from about 400 to about 12,000, more preferably from about 400 to about 7,000 or 5,000. Typically, the polyethers are made by polymerization of ethylene oxide alone or as a mixture with propylene oxide, butylene oxide, THF, or the like or in succession addition. Polythioethers, polyacetals, polycarbonates, polyester amides and polyamides, and other polyhydroxyl compounds may also be used.

The amine terminated polyether resins are useful for the invention of polyether resins made from an appropriate initiator to which lower alkylene oxide such as ethylene oxide, propylene oxide, butylene oxide, or mixtures thereof are added with the resulting hydroxyl terminated polyol then being aminated. When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups. However, the majority of the hydroxyl groups are replaced by amine groups. Therefore the amine terminated polyether resins useful in this invention generally have greater than 50% of the active hydrogens in the form of amine hydrogens. If ethylene oxide is used it is desirable to react the hydroxyl termninated polyol with a small amount of higher alkylene oxide to ensure that the terminal hydroxyl groups are essentially all secondary hydroxyl groups. The polyols are thereafter reductively aminated.

Suitable polyesters containing hydroxyl groups include, e.g. reaction products of polyhydric (preferably dihydric) alcohols, optionally with the addition of trihydric alcohols, and polybasic (preferably dibasic) carboxylic acids. Instead of free polycarboxylic acids, the corresponding polycarboxylic acid anhydrides or corresponding polycarboxylic acid esters of lower alcohols or mixtures thereof may, of course, be used for preparing the polyesters. The polycarboxylic acids may be aliphatic, cycloaliphatic, aromatic, and/or heterocyclic and they may be substituted, e.g. by halogen atoms, and/or may be unsaturated. Exemplary compounds include succinic acid, adipic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, glutaric acid anhydride, maleic acid, maleic acid anhydride, dimeric and trimeric fatty acids such as oleic acid. Exemplary polyhydric alcohols include ethylene glycol, propylene glycol, butylene glycol, hexanediol, octanediol, neopentyl glycol, cyclohexane dimethanol, 2-methyl-1,3-propanediol, glycerol, trimethylolpropane, hexanetriol, butanetriol, trimethylolethane, pentaerythritol, mannitol, sorbitol, methyl glycoside, diethylene glycol, triethylene glycol, dipropylene glycol, polypropylene glycol, dibutylene glycol, polybutylene glycols, and the like. The polyesters may also contain a proportion of carboxyl end groups. Polyesters of lactones may also be used. The polyesters have at least 2 and generally from 2 to 8, preferably 2 or 3, hydroxyl groups.

The organic active hydrogen group-containing compounds thus include polyethers, polyhydroxy polyols, amine terminated polyethers, and other compounds. They are sometimes referred to as having isocyanate reactive hydrogens or Zerewitinoff active hydrogens. Of course, such a description may also refer to the hydrogens of the chain extenders.

Release agents generally known in the art as "external mold release agents", such as silicon oils, are frequently used when carrying out a cast elastomer process and also for certain RIM processes. Various "internal mold release agents" may also be used.

The quantities ofreactants used to make apolyurethane according to the invention is such that the number of —NCO functions is substantially the same as the combined amino groups of the chain extender and active hydrogen groups of the active hydrogen group-containing compound. That is, the quantities of reactants used in the process according to the present invention are generally adjusted so that the molar ratio of polyisocyanates to combined active hydrogen group-containing compound and chain extender is from about 0.8 to about 1.2, sometimes larger depending on the particular procedure employed. Typically, with prepolymers in a cast elastomer process, the isocyanate content of the prepolymer is from about 1 to 10 percent, by weight, preferably 2 to 7 percent by weight. With non-prepolymer formulations, the isocyanate content by weight is much higher, e.g. 19 weight percent or more. The combined active hydrogen groups and amino groups (from the diamine extender) must accordingly comprise a total molar amount equivalent to the isocyanate functions.

Thus for cast elastomer prepolymer formulation systems a portion of diamine is chosen so that the ratio of free —NCO groups to $NH_2$ groups is from 1:0.8 to 1:1.2, preferably 1:0.95 to 1:1.05. That is, about one equivalent part of prepolymer is reacted with about a stoichiometric equivalent part of diamine.

The molar ratio of reactive hydrogens in the chain lengthening agent, to reactive groups in the organic active hydrogen group-containing compound may vary within wide limits but is preferably within the range of about 0.4 to 1.5 such that the polyurethanes obtained range from soft to rigid polymers. The chain extender generally comprises from 2–50 weight percent, preferably 5–30 weight percent of the reaction mixture for the elastomer.

Elastic and semi-elastic foams are obtainable by using the polyurethane components of the present invention and such foams may be used in upholstery, padding materials, mattresses, and the like.

Active hydrogen-containing compounds are often utilized as reaction components when forming polyurethanes. See for example U.S. Pat. No. 4,294,934. Thus in any operation wherein an active hydrogen group-containing compound is customarily or desirably used in forming the polymer, such usage is within the scope of this invention.

Polyurethanes may be formed by reacting the components of a system over a broad range of temperatures, generally room temperature (30° C.) to 150° C., preferably 35° C. to 110° C.

Typically polyurethane elastomers are made by pouring a reaction mixture into a mold where the mixture is allowed to cure. Production can be carried out by a one-shot or a prepolymer method. In the prepolymer method, an organic active hydrogen group-containing compound, often a polyol, of about 400 to 5,000 molecular weight and of the polyester or polyether type, is reacted with a stoichiometric excess of diisocyanate to produce a prepolymer. Chain extension is then carried out with a chain extender mixture of this invention. In the one-shot method an isocyanate stream is mixed with a stream containing the other components, usually including a catalyst such as dibutyl tin dilaurate.

Factors influencing the final properties of the polymer are molecular structure, chain entanglement, and secondary binding forces such as the hydrogen bonding and Van der Waals forces. These are controlled by selection of the molecular components employed, as well known in the art. For example, typically each backbone exhibits its own advantages and disadvantages; e.g. polyether types display better resilience, lower heat buildup, better hydrolytic stability, good low temperature properties, and low processing viscosity. The polyesters, however, are tough, abrasion-resistant elastomers with better oil resistance and can be produced at lower costs. It should be noted that these comparisons are made with urethanes having the same hardness.

A common technique for producing high quality castings is by the use of an automatic dispensing machine. The machine degasses the prepolymer either in a batch or continuous mode and meters it along with the chain extender in controlled proportions to a mix head. Here the components are mixed thoroughly, then discharged into a mold. A significant advantage in liquid casting is that less capital expense is required for processing equipment as compared to that needed for the thermoplastic or millable gum elastomers.

Urethane cast elastomers of the type known in the art have a hardness range of approximately 10 Shore A to 80 Shore D. These polymers are tough, abrasion-resistant, with good mechanical strength and oxidation resistance. They are used in truck tires, grain chute liners, conveyor belts, gears, seals, and in many industrial parts.

The polymerization mixtures and finished compositions of this invention may also include other materials commonly employed in making polyurethane products. These include blowing agents such as water, and volatile organic substances such as volatile hydrocarbons or certain volatile halohydrocarbons or halocarbons. One or more additional components such as one or more flame retardants, emulsifiers, reaction decelerators, dyes, cell regulators, bacteriostatic agents, mold release agents, foam stabilizers, fillers, and the like, may also be included.

A catalyst may comprise from about 0.00001 to 10 weight percent, preferably from about 0.001 to about 1.0 weight percent of the total reaction mixture. Tin compounds are typically used as catalysts.

Components referred to by chemical name anywhere in the specification or claims hereof, whether referred to in the singular or plural, are identified as they exist prior to coming into contact with another substance referred to by chemical name or chemical type (e.g., another component, a solvent, or etc.). It matters not what preliminary chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. Thus the fact that a substance, component or ingredient may have lost its original identity through a chemical reaction or transformation during the course of contacting, blending or mixing operations, if conducted in accordance with this disclosure and with the application of common sense and the ordinary skill of a chemist, is thus wholly immaterial for an accurate understanding and appreciation of the true meaning and substance of this disclosure and the claims thereof.

Each and every patent, published patent application, or other publication referred to in any portion of this specification is incorporated ini toto into this disclosure by reference, as if fully sct forth herein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

That which is claimed is:

1. A process of producing a polyurethane which comprises contacting an isocyanate prepolymer with a mixture of isomeric alkylthiated mononuclear aromatic amines and curing the resultant mixture, said mixture of isomeric alkylthiated mononuclear aromatic amines prior to said contacting comprising in the range of about 30 to about 70 mole percent of (i) at least one component of the formula

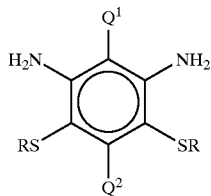

and in the range of about 30 to about 70 mole percent of (ii) at least one component of the formula

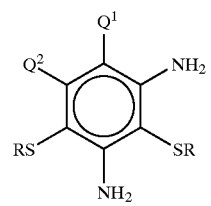

wherein $Q^1$ is an alkyl group of from 1 to 4 carbon atoms, $Q^2$ is, independently, a hydrogen atom or an alkyl group of from 1 to 4 carbon atoms, and each R is, independently an alkyl group of from 1 to 4 carbon atoms, and wherein the total percentage of (i) and (ii) in the mixture is at least 90 mole percent, such mixture optionally containing up to 10 mole percent of one or more isomers of (i) and (ii).

2. A process of claim 1 wherein the total percentage of (i) and (ii) in said mixture of isomeric alkylthiated mononuclear aromatic amines prior to said contacting is at least 95 mole percent and wherein prior to said contacting such mixture optionally contains up to 5 mole percent of one or more isomers of (i) and (ii).

3. A process of claim 2 wherein the mixture of isomeric alkylthiated mononuclear aromatic amines prior to said contacting comprises in the range of about 40 to about 60 mole percent of (i), and in the range of about 40 to about 60 mole percent of (ii), and the total percentage of (i) and (ii) in the mixture of isomeric alkylthiated mononuclear aromatic amines prior to said contacting is at least about 97 mole percent, such mixture of isomeric alkylthiated mononuclear aromatic amines prior to said contacting optionally containing up to about 3 mole percent of one or more positional isomers of (i) and (ii).

4. A process of claim 2 wherein the mixture of isomeric alkylthiated mononuclear aromatic amines prior to said contacting comprises in the range of about 52 to about 58 mole percent of (i), and in the range of about 42 to about 48 mole percent of (ii), and the total percentage of (i) and (ii) in the mixture of isomeric alkylthiated mononuclear aromatic amines prior to said contacting is at least about 98 mole percent, such mixture of isomeric alkylthiated mononuclear aromatic amines prior to said contacting optionally containing up to about 2 mole percent of one or more positional isomers of (i) and (ii).

5. A process of claim 2 wherein $Q^2$ is a hydrogen atom.

6. A process of claim 5 wherein the mixture of isomeric alkylthiated mononuclear aromatic amines prior to said contacting comprises in the range of about 40 to about 60 mole percent of (i), and in the range of about 40 to about 60 mole percent of (ii), and the total percentage of (i) and (ii) in the mixture of isomeric alkylthiated mononuclear aromatic amines prior to said contacting is at least about 97 mole percent, such mixture of isomeric alkylthiated mononuclear aromatic amines prior to said contacting optionally containing up to about 3 mole percent of one or more positional isomers of (i) and (ii).

7. A process of claim 5 wherein the mixture of isomeric alkylthiated mononuclear aromatic amines prior to said contacting comprises in the range of about 52 to about 58 mole percent of (i), and in the range of about 42 to about 48 mole percent of (ii), and the total percentage of (i) and (ii) in the mixture of isomeric alkylthiated mononuclear aromatic amines prior to said contacting is at least about 98 mole percent, such mixture of isomeric alkylthiated mononuclear aromatic amines prior to said contacting optionally containing up to about 2 mole percent of one or more positional isomers of (i) and (ii).

8. A process of claim 5 wherein the alkyl group in the 1-position is methyl and the alkylthio groups in components (i) and (ii) are, independently, methylthio or ethylthio groups.

9. A process of claim 8 wherein the mixture of isomeric alkylthiated mononuclear aromatic amines prior to said contacting comprises in the range of about 40 to about 60 mole percent of (i), and in the range of about 40 to about 60 mole percent of (ii), and the total percentage of (i) and (ii) in the mixture of isomeric alkylthiated mononuclear aromatic amines prior to said contacting is at least about 97 mole percent, such mixture of isomeric alkylthiated mononuclear aromatic amines prior to said contacting optionally containing up to about 3 mole percent of one or more positional isomers of (i) and (ii).

10. A process of claim 8 wherein the mixture of isomeric alkylthiated mononuclear aromatic amines prior to said contacting comprises in the range of about 52 to about 58 mole percent of (i), and in the range of about 42 to about 48 mole percent of (ii), and the total percentage of (i) and (ii) in the mixture of isomeric alkylthiated mononuclear aromatic amines prior to said contacting is at least about 98 mole percent, such mixture of isomeric alkylthiated mononuclear aromatic amines prior to said contacting optionally containing up to about 2 mole percent of one or more positional isomers of (i) and (ii).

11. A process of claim 5 wherein said mixture of isomeric alkylthiated mononuclear aromatic amines prior to said contacting is a mixture of about 30 to about 70 mole percent of 3,5-di(methylthio)-2,6-diaminotoluene and in the range of about 30 to about 70 mole percent of 3,5-di(methylthio)-2,4-diaminotoluene, such mixture of 3,5-di(methylthio)-2,6-diaminotoluene and 3,5-di(methylthio)-2,4-diaminotoluene prior to said contacting optionally containing up to about 10 mole percent of one or more positional isomers of (i) and (ii).

12. A process of claim 11 wherein said mixture of 3,5-di(methylthio)-2,6-diaminotoluene and 3,5-di(methylthio)-2,4-diaminotoluene prior to said contacting is a mixture of about 40 to about 60 mole percent of 3,5-di(methylthio)-2,6-diaminotoluene and in the range of about 40 to about 60 mole percent of 3,5-di(methylthio)-2,6-diaminotoluene, such mixture of 3,5-di(methylthio)-2,6-diaminotoluene and 3,5-di(methylthio)-2,4-diaminotoluene prior to said contacting optionally containing up to about 3 mole percent of one or more positional isomers of (i) and (ii).

13. A process of claim 11 wherein said mixture of 3,5-di(methylthio)-2,6-diaminotoluene and 3,5-di(methylthio)-2,4-diaminotoluene prior to said contacting is a mixture of about 52 to about 58 mole percent of 3,5-di(methylthio)-2,6-diaminotoluene and in the range of about 42 to about 48 mole percent of 3,5-di(methylthio)-2,6-diaminotoluene, such mixture of 3,5-di(methyl-thio)-2,6-diaminotoluene and 3,5-di(methylthio)-2,4-diaminotoluene prior to said contacting optionally containing up to about 2 mole percent of one or more positional isomers of (i) and (ii).

14. A polyurethane produced in accordance with a process of any of claims 1–13.

15. A polyurethane-urea or polyurea produced by reacting:
   A) a mixture of isomeric alkylthiated mononuclear aromatic amines comprising in the range of about 30 to about 70 mole percent of (i) at least one component of the formula

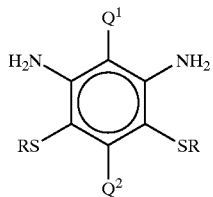

and in the range of about 30 to about 70 mole percent of (ii) at least one component of the formula

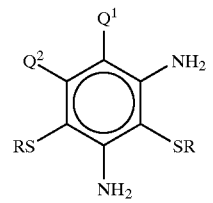

wherein $Q^1$ is an alkyl group of from 1 to 4 carbon atoms, $Q^2$ is, independently, a hydrogen atom or an alkyl group of from 1 to 4 carbon atoms, and each R is, independently an alkyl group of from 1 to 4 carbon atoms, and wherein the total percentage of (i) and (ii) in the mixture is at least 90 mole percent, such mixture optionally containing up to 10 mole percent of one or more isomers of (i) and (ii); with
   B) a di- or polyisocyanate or an isocyanate prepolymer containing free —NCO groups, or
   C) a blend of a di- or polyisocyanate or an isocyanate prepolymer containing free —NCO groups with at least one hydroxyl- or amine-terminated aliphatic compound.

16. A polyurethane-urea or polyurea of claim 15 wherein the total percentage of (i) and (ii) in said mixture of isomeric alkylthiated mononuclear aromatic amines is at least 95 mole percent and wherein such mixture optionally contains up to 5 mole percent of one or more isomers of (i) and (ii).

17. A process for producing a polyurethane-urea or polyurea, which process comprises reacting:
   A) a mixture of isomeric alkylthiated mononuclear aromatic amines comprising in the range of about 30 to about 70 mole percent of (i) at least one component of the formula

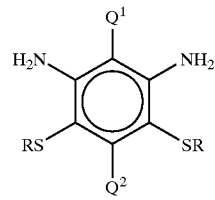

and in the range of about 30 to about 70 mole percent of (ii) at least one component of the formula

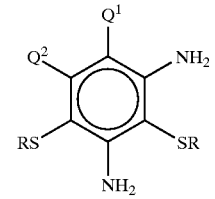

wherein $Q^1$ is an alkyl group of from 1 to 4 carbon atoms, $Q^2$ is, independently, a hydrogen atom or an alkyl group of from 1 to 4 carbon atoms, and each R is, independently an alkyl group of from 1 to 4 carbon atoms, and wherein the total percentage of (i) and (ii) in the mixture is at least 90 mole percent, such mixture optionally containing up to 10 mole percent of one or more isomers of (i) and (ii); with
   B) a di- or polyisocyanate or an isocyanate prepolymer containing free —NCO groups, or
   C) a blend of a di- or polyisocyanate or an isocyanate prepolymer containing free —NCO groups with at least one hydroxyl- or amine-terminated aliphatic compound.

18. A process of claim 17 wherein the total percentage of (i) and (ii) in said mixture of isomeric alkylthiated mononuclear aromatic amines is at least 95 mole percent and wherein such mixture optionally contains up to 5 mole percent of one or more isomers of (i) and (ii).

* * * * *